J. W. LOCKWOOD.
Insoles.

No. 150,870.

Patented May 12, 1874.

WITNESSES:
Jas. E. Hutchinson
Wm. Hall

INVENTOR
Jno. W. Lockwood
per
F. A. Lehmann, Atty.

UNITED STATES PATENT OFFICE.

JOHN W. LOCKWOOD, OF NEWBURG, NEW YORK.

IMPROVEMENT IN INSOLES.

Specification forming part of Letters Patent No. 150,870, dated May 12, 1874; application filed December 26, 1873.

*To all whom it may concern:*

Be it known that I, JOHN W. LOCKWOOD, of Newburg, in the county of Orange and State of New York, have invented certain new and useful Improvements in Insoles; and I do hereby declare the following to be a full, clear, and exact description of the invention, such as will enable others skilled in the art to which it pertains to make and use it, reference being had to the accompanying drawings which form part of this specification.

The nature of my invention relates to an improvement in insoles for boots and shoes; and it consists in layers of water-proof material, double layers of wood with the fibers crossing each other, felt or paper, and muslin, silk, or other material, which are cut into proper shape and then secured together, as will be more fully described hereafter.

The accompanying drawings represent my invention.

Figure 1:
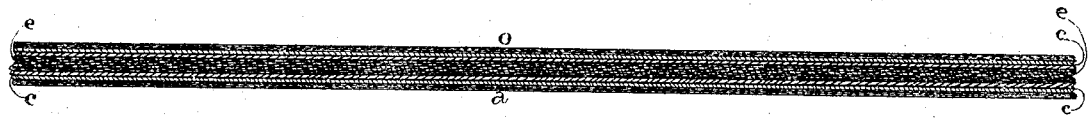
Figure 2:
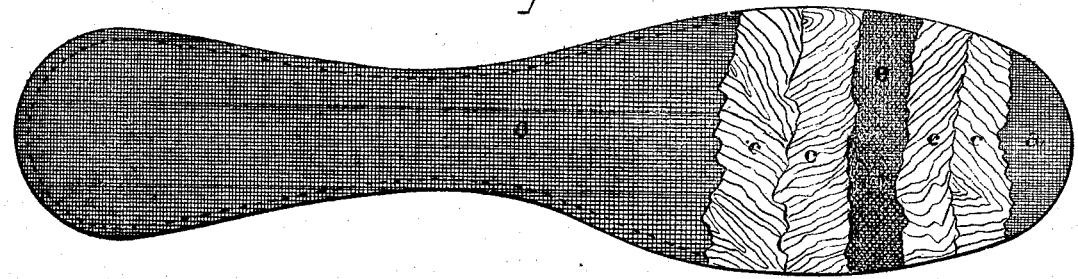

$a$ represents a layer of any thin water-proof material, paper preferred. Upon this layer $a$ are placed two very thin layers of wood veneering, $c$, each of which has its fibers extending in opposite directions so as to cross each other. On top of the wood is a thick layer of felt, $e$, and upon the top of this are two more layers of veneering, with the fibers crossing each other. Upon the top of the upper layer of wood is placed a layer of muslin, silk, or other material, $o$, which will not absorb the perspiration of the feet. After these layers have all been pasted, glued, or cemented together, they are passed under a sewing-machine and stitched, as shown in Figure 2.

The felt serves as a non-conductor of heat, and by preventing the heat of the foot from passing off through the sole of the boot or shoe the foot is always kept warm. By placing the layers of wood and water-proof material under the felt it is protected from the dampness of the sole, and by means of the layers of wood and muslin or silk upon its top the felt is protected from the moisture and perspiration of the foot.

I claim—

The layer of felt, $e$, having a double layer of wood, $c$, upon each side, with the fibers crossing each other, and a layer of water-proof material on the bottom, and a layer of muslin or silk, $o$, on the top, substantially as shown and described.

In testimony that I claim the foregoing I hereunto set my hand and seal this 11th day of December, 1873.

JOHN W. LOCKWOOD. [L. S.]

Witnesses:
N. H. SCHRAM,
SAMUEL BROWN.